(12) United States Patent
Kalva et al.

(10) Patent No.: US 12,238,315 B2
(45) Date of Patent: Feb. 25, 2025

(54) METHODS AND SYSTEMS FOR CONSTRUCTING MERGE CANDIDATE LIST INCLUDING ADDING A NON-ADJACENT DIAGONAL SPATIAL MERGE CANDIDATE

(71) Applicant: OP Solutions, LLC, Amherst, MA (US)

(72) Inventors: Hari Kalva, Boca Raton, FL (US); Borivoje Furht, Boca Raton, FL (US); Velibor Adzic, Boca Raton, FL (US)

(73) Assignee: OP Solutions LLC, Amherst, MA (US)

( * ) Notice: Subject to any disclaimer, the term of this patent is extended or adjusted under 35 U.S.C. 154(b) by 0 days.

(21) Appl. No.: 17/282,912

(22) PCT Filed: Oct. 4, 2019

(86) PCT No.: PCT/US2019/054816
§ 371 (c)(1),
(2) Date: Apr. 5, 2021

(87) PCT Pub. No.: WO2020/072969
PCT Pub. Date: Apr. 9, 2020

(65) Prior Publication Data
US 2021/0400289 A1  Dec. 23, 2021

Related U.S. Application Data

(60) Provisional application No. 62/741,639, filed on Oct. 5, 2018.

(51) Int. Cl.
*H04N 19/105* (2014.01)
*H04N 19/169* (2014.01)
(Continued)

(52) U.S. Cl.
CPC .......... *H04N 19/44* (2014.11); *H04N 19/105* (2014.11); *H04N 19/176* (2014.11); *H04N 19/1883* (2014.11); *H04N 19/96* (2014.11)

(58) Field of Classification Search
CPC .... H04N 19/44; H04N 19/105; H04N 19/176; H04N 19/1883; H04N 19/96; H04N 19/52; H04N 19/593
(Continued)

(56) References Cited

U.S. PATENT DOCUMENTS

2014/0269909 A1* 9/2014 Oh .................. H04N 19/119
375/240.03
2014/0294086 A1* 10/2014 Oh .................. H04N 19/513
375/240.16
(Continued)

FOREIGN PATENT DOCUMENTS

CA   3039155 A1   4/2018
WO   2017197126 A1   11/2017

OTHER PUBLICATIONS

Yu et al. ("CE 4-2/1: Adding non-adjacent spatial merge candidates", JVET-K0228-v1, Jul. 10-18, 2018) discloses a distance of 1 CTU (p. 1, section 1) (Year: 2018).*
(Continued)

*Primary Examiner* — Matthew K Kwan
(74) *Attorney, Agent, or Firm* — OP Solutions IP Department; Paul Ackerman

(57) ABSTRACT

A decoder includes circuitry configured to receive a bitstream, determine whether a merge mode is enabled for a block, construct a merge candidate list including adding a non-adjacent diagonal spatial candidate to the merge candidate list, and reconstruct pixel data of the block and using the merge candidate list. Related apparatus, systems, techniques and articles are also described.

3 Claims, 9 Drawing Sheets

(51) Int. Cl.
*H04N 19/176* (2014.01)
*H04N 19/44* (2014.01)
*H04N 19/96* (2014.01)

(58) Field of Classification Search
USPC .................................................. 375/240.25
See application file for complete search history.

(56) References Cited

U.S. PATENT DOCUMENTS

| 2016/0295240 | A1 | 10/2016 | Kim et al. | |
| 2017/0332099 | A1* | 11/2017 | Lee | H04N 19/122 |
| 2018/0359483 | A1* | 12/2018 | Chen | H04N 19/44 |
| 2020/0045306 | A1* | 2/2020 | Lee | H04N 19/513 |
| 2020/0059658 | A1* | 2/2020 | Chien | H04N 19/52 |

OTHER PUBLICATIONS

PCT/US2019/054816; International Search Report; Date: Dec. 19, 2019; By: Authorized Office: Blaine R. Copenheaver.
European Search Report in correspoding EP application 19868332.8.
Y-W Chen et al: "Description of SDR, HDR and 360 video coding technology proposal by Qualcomm and Technicolor—low and high complexity versions." JVET Meeting, Apr. 10, 2018-Apr. 29, 2018; San Diegor; JVET-J0021-v5, Apr. 14, 2018.
Haitao Yang et al, "Description of Core Experiment 4 (CE4) Inter prediction and Motion Vector Coding." JVET Meeting, Jul. 11, 2018-Jul. 18, 2018; Ljubljana; JVET-K1024_v4, Jul. 18, 2018.

* cited by examiner

METHODS AND SYSTEMS FOR CONSTRUCTING MERGE CANDIDATE LIST INCLUDING ADDING A NON-ADJACENT DIAGONAL SPATIAL MERGE CANDIDATE

CROSS-REFERENCE TO RELATED APPLICATIONS

This application is a national phase of International Application No. PCT/US19/54816 filed on Oct. 4, 2019 and entitled "METHODS AND SYSTEMS FOR CONSTRUCTING MERGE CANDIDATE LIST INCLUDING ADDING A NON-ADJACENT DIAGONAL SPATIAL MERGE CANDIDATE," which claims the benefit of priority to U.S. Provisional Application Ser. No. 62/741,639, filed on Oct. 5, 2018 and entitled "CONSTRUCTING MERGE CANDIDATE LIST INCLUDING ADDING A NON-ADJACENT DIAGONAL SPATIAL MERGE CANDIDATE" each of which is incorporated by reference herein in its entirety.

FIELD OF THE INVENTION

The present invention relates generally to the field of technologies to compress and decompress digital video, including decoding and encoding. In particular, the present invention is directed to method and systems for constructing a merge candidate list including adding a non-adjacent diagonal spatial merge candidate.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

SUMMARY OF THE DISCLOSURE

In an aspect, a decoder includes circuitry configured to receive a bitstream, determine whether a merge mode is enabled for a block, construct a merge candidate list including adding a non-adjacent diagonal spatial candidate to the merge candidate list, and reconstruct pixel data of the block and using the merge candidate list.

One or more of the following features can be included in any feasible combination. The circuitry can be further configured to extract or determine from the bitstream an index and select, from the constructed merge candidate list and according to the index, a merge candidate. Reconstructing pixel data of the block can include determining a prediction using motion information of the merge candidate for the block. Constructing the merge candidate list can include marking each of spatial candidates $A1$, $B1$, $B0$, $A0$, and $A2$ as available or unavailable; determining whether the number of available spatial candidates is less than a predefined threshold; in response to the number of available spatial candidates being less than the predefined threshold, marking the non-adjacent diagonal spatial candidate as available; and adding available merge candidates to the merge candidate list.

The non-adjacent diagonal spatial candidate may be within 1 coding tree unit from the block. The non-adjacent diagonal spatial candidate may reside at a luma location that is immediately above and to the left of an upper left adjacent spatial merge candidate. The decoder may include an entropy decoder processor configured to receive the bit stream and decode the bitstream into quantized coefficients; an inverse quantization and inverse transformation processor configured to process the quantized coefficients including performing an inverse discrete cosine; a deblocking filter; a frame buffer; and an intra prediction processor.

Constructing the merge candidate list may include marking each of a non-adjacent vertical spatial candidate, the non-adjacent diagonal spatial candidate, and a non-adjacent horizontal spatial candidate as available or unavailable; and adding available merge candidates to the merge candidate list.

The block may form part of a quadtree plus binary decision tree. The block may include a non-leaf node of the quadtree plus binary decision tree. The block may include a prediction unit or a coding unit. The circuitry may be further configured to evaluate temporal merge candidates, bi-predictive candidates, and zero motion vector candidates; and add available temporal merge candidates, available bi-predictive candidates, and available zero motion vector candidates to the merge candidate list.

In another aspect, a method includes receiving, by a decoder, a bitstream; determining, by the decoder, whether a merge mode is enabled for a block; constructing, by the decoder, a merge candidate list including adding a non-adjacent diagonal spatial candidate to the merge candidate list; and reconstructing, by the decoder, pixel data of the block and using the merge candidate list.

One or more of the following features may be included in any feasible combination. For example, the method may further include: extracting or determining, from the bitstream, an index; and selecting, from the constructed merge candidate list and according to the index, a merge candidate. Reconstructing pixel data of the block may include determining a prediction using motion information of the merge candidate for the block. Constructing the merge candidate list may include: marking each of spatial candidates $A1$, $B1$, $B0$, $A0$, and $A2$ as available or unavailable; determining whether the number of available spatial candidates is less than a predefined threshold; marking, in response to the number of available spatial candidates being less than the predefined threshold, the non-adjacent diagonal spatial candidate as available; and adding available merge candidates to the merge candidate list.

The non-adjacent diagonal spatial candidate may be within 1 coding tree unit from the block. The non-adjacent diagonal spatial candidate may reside at a luma location that is immediately above and to the left of an upper left adjacent spatial merge candidate.

The decoder may include: an entropy decoder processor configured to receive the bit stream and decode the bitstream into quantized coefficients; an inverse quantization and inverse transformation processor configured to process the quantized coefficients including performing an inverse discrete cosine; a deblocking filter; a frame buffer; and an intra prediction processor.

Constructing the merge candidate list may include marking each of a non-adjacent vertical spatial candidate, the non-adjacent diagonal spatial candidate, and a non-adjacent horizontal spatial candidate as available or unavailable; and adding available merge candidates to the merge candidate list.

The block may form part of a quadtree plus binary decision tree. The block may include a non-leaf node of the quadtree plus binary decision tree. The block may include a prediction unit or a coding unit. The method may further include evaluating temporal merge candidates, bi-predictive candidates, and zero motion vector candidates; and adding available temporal merge candidates, available bi-predictive candidates, and available zero motion vector candidates to the merge candidate list.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods may be implemented by one or more data processors either within a single computing system or distributed among two or more computing systems. Such computing systems may be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

Like reference symbols in the various drawings indicate like elements.

DETAILED DESCRIPTION

Some implementations of the current subject matter include constructing a merge candidate list including adding a non-adjacent diagonal spatial candidate to the merge candidate list. In some existing encoding and decoding techniques, predefined spatial merge candidates are added to a merge candidate list only if they are available. But where there is a minimum merge candidate list size and an insufficient number of merge candidates are available, the merge candidate list may have copies of candidates, or a zero candidate added to the list in order to reach the minimum merge candidate list size. However, creating copies of candidates or adding zero candidates may result in unnecessary computations. Further, there may be another block that is a better candidate that is not added to the merge candidate list. Accordingly, some aspects of the current subject matter includes constructing a merge candidate list by adding a non-adjacent diagonal spatial candidate is added to the merge candidate list. By adding a non-adjacent diagonal spatial merge candidate to the merge candidate list, compression efficiency can be improved.

Motion compensation can include an approach to predict a video frame or a portion thereof given the previous and/or future frames by accounting for motion of the camera and/or objects in the video. It can be employed in the encoding and decoding of video data for video compression, for example in the encoding and decoding using the Motion Picture Experts Group (MPEG)-2 (also referred to as advanced video coding (AVC)) standard. Motion compensation can describe a picture in terms of the transformation of a reference picture to the current picture. The reference picture can be previous in time or from the future when compared to the current picture. When images can be accurately synthesized from previously transmitted and/or stored images, the compression efficiency can be improved.

Block partitioning can refer to a method in video coding to find regions of similar motion. Some form of block partitioning can be found in video codec standards including MPEG-2, H.264 (also referred to as AVC or MPEG-4 Part 10), and H.265 (also referred to as High Efficiency Video Coding (HEVC)). In example block partitioning approaches, non-overlapping blocks of a video frame can be partitioned into rectangular sub-blocks to find block partitions that contain pixels with similar motion. This approach can work well when all pixels of a block partition have similar motion. Motion of pixels in a block can be determined relative to previously coded frames.

Figure 1:
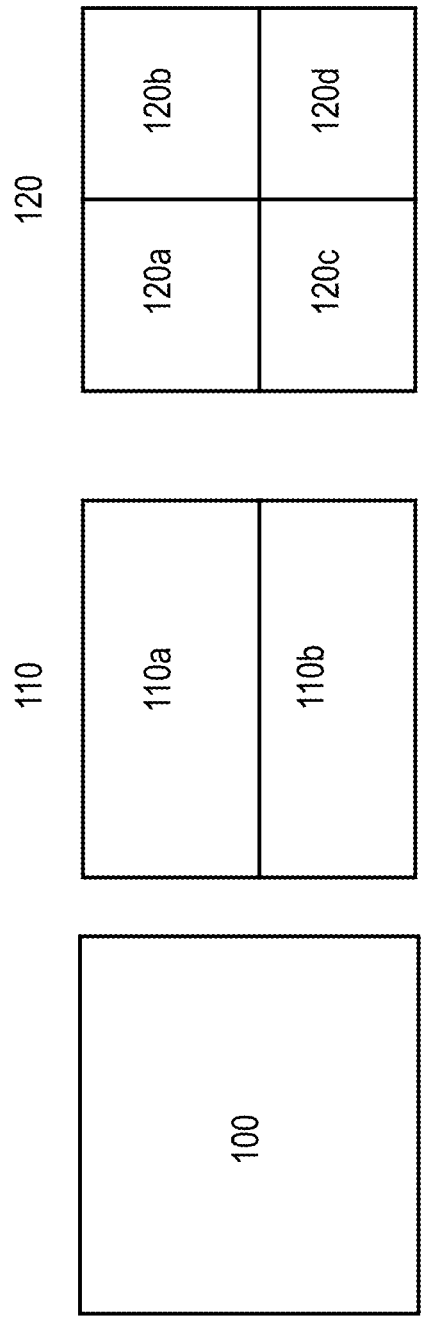
FIG. 1 is diagram illustrating an example of block partitioning of pixels.

FIG. 1 is diagram illustrating an example of block partitioning of pixels. An initial rectangular picture or block 100, which may itself be a sub-block (e.g., a node within a coding tree), can be partitioned into rectangular sub-blocks. For example, at 110, block 100 is partitioned into two rectangular sub-blocks 110a and 110b. Sub-blocks 110a and 110b can then be processed separately. As another example, at 120, block 100 is partitioned into four rectangular sub-blocks 120a, 120b, 120c, and 120d. Sub-blocks may themselves be further divided until it is determined that the pixels within the sub-blocks share the same motion, a minimum block size is reached, or another criteria. When pixels in a sub-block have similar motion, a motion vector can describe the motion of all pixels in that region.

Some blocks may share the same motion vector information. For example, two blocks corresponding to an object moving across the screen may share the same motion vector as they both relate to the same object. In such scenarios, some approaches to motion compensation can utilize a merge mode, in which neighboring blocks may share a motion vector allowing the motion information to be encoded in the bitstream for a first block, and a second block can inherit motion information from (e.g., merge with) the first block. During encoding, a merge candidate list can be constructed containing available merge candidates. A merge candidate can be selected from the constructed merge candidate list and an index to the merge candidate list can be signaled in the bitstream. During decoding, the merge candidate list can again be constructed from available merge candidates, and the index signaled in the bitstream can be used to indicate which block a current block will inherit motion information from (e.g., merge with).

Figure 2:
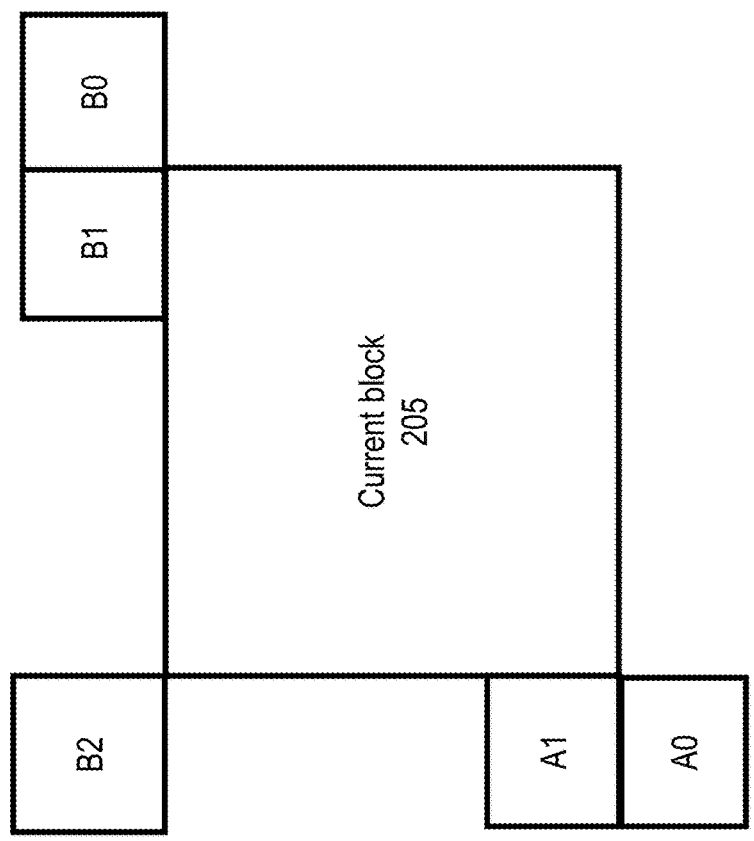
FIG. 2 is a block diagram illustrating spatial candidates that are considered in a typical approach to merge mode.

FIG. 2 is a block diagram illustrating spatial candidates that are considered in a typical approach to merge mode, such as is implemented for HEVC. A current block 205 can include a coding unit or prediction unit. Spatial merge candidates can include A0, A1, B0, B1, and B2. A0, A1, B0, and B2 can include the neighboring prediction and/or coding units. More specifically, A0 can be a below-left block, A1 can be a left block, B0 can be an above-right block, B1 can be an above block, and B2 can be an above-left block. When creating a merge candidate list, the list can be constructed by considering up to four spatial merge candidates derived from five spatial neighbor blocks, as shown in FIG. 2. In this example, a threshold of five spatial candidates can be imposed. In addition to considering the spatial candidates illustrated in FIG. 2, additional candidates that can be considered for addition to the merge candidate list can include one temporal merge candidate that can be derived from two temporal, co-located blocks; combined bi-predictive candidates, and zero motion vector candidates.

Figure 3:
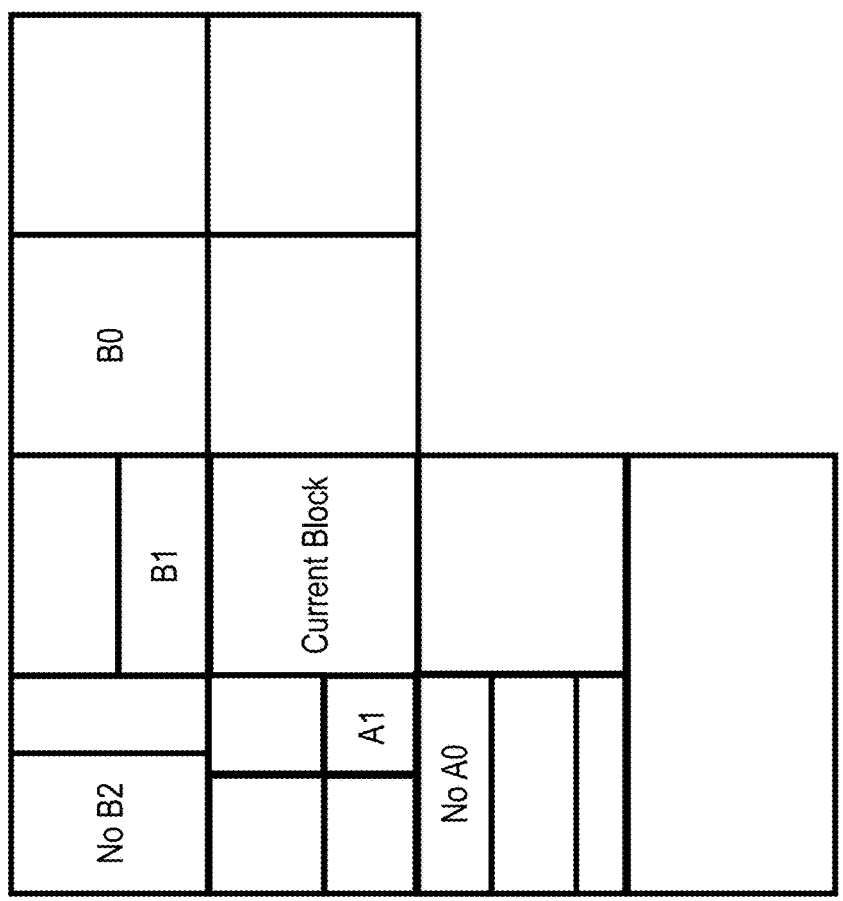
FIG. 3 illustrates an example of partitioning when only three adjacent spatial merge candidates (B1, B0, and A1) are available to the current block.

Spatial merge candidates can be added to the merge candidate list in response to determining that they are available. In a quadtree plus binary decision tree (QTBT) partitioning some of the neighbor blocks can be asymmetrical blocks, and therefore they may not be considered as spatial merge candidates (e.g., may be marked as unavailable) because it is probable that they are asymmetrically partitioned because the partitions (e.g., prediction units) do not share similar motion information. FIG. 3 illustrates an example of partitioning when only three adjacent spatial merge candidates (B1, B0, and A1) are available to the current block. In the example in FIG. 3, for the current block B1, B0 and A1 are marked available and thus can be added to the merge candidate list as adjacent spatial merge candidates. B2 and A0 are marked as unavailable (e.g., are not available), because the blocks are asymmetrical and automatically marked as unavailable (e.g., not available). Therefore, where there is a minimum size to the merge candidate list and/or a minimum number of spatial merge candidates required, there can be a need to add additional merge candidates. Rather than adding a zero motion vector candidate, the current subject matter can include evaluating and/or adding a diagonal non-adjacent spatial merge candidate to the merge candidate list in order to reach the minimum number (e.g., to have five available spatial merge candidates).

Figure 8:
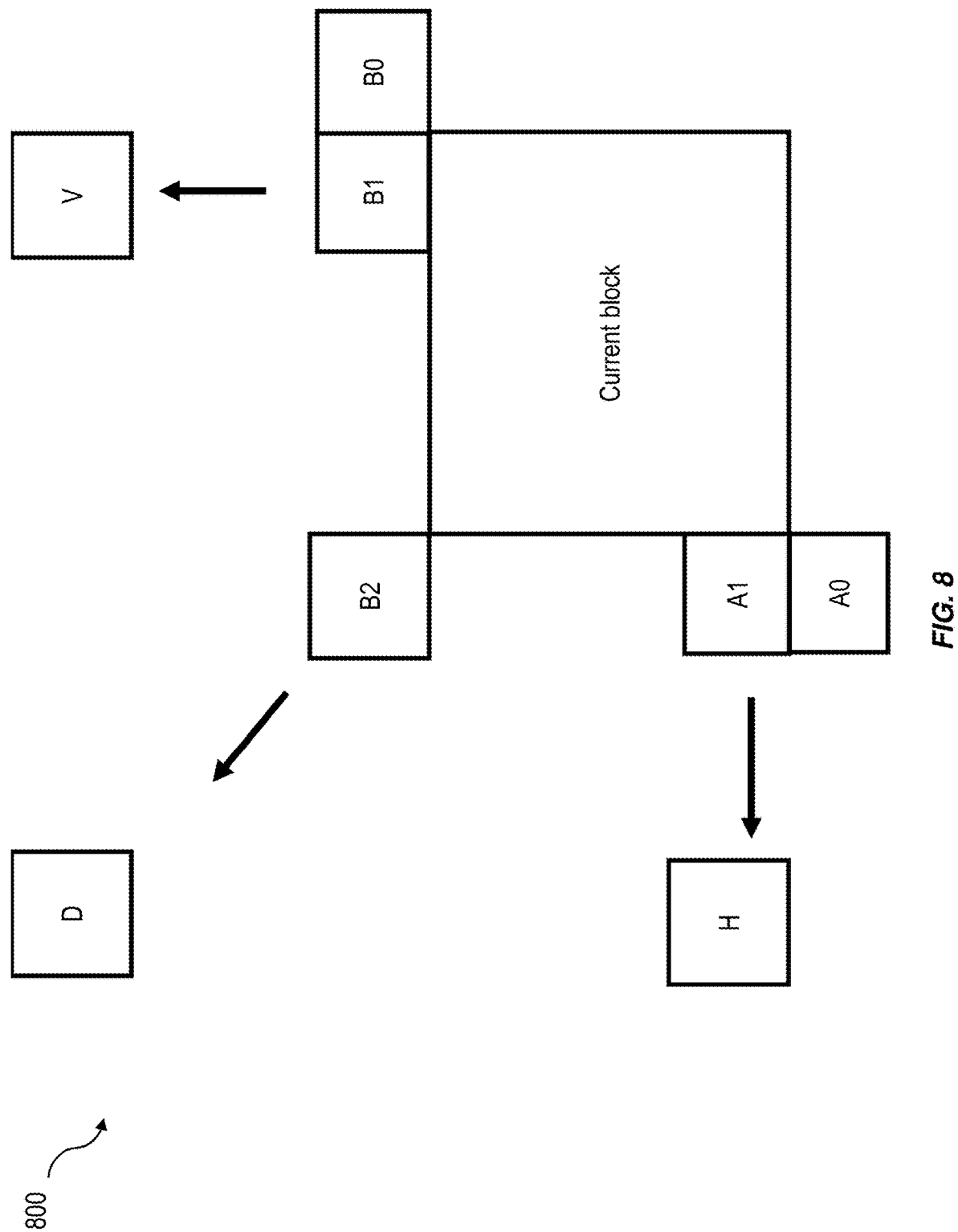
FIG. 8 illustrates an example in which three potential non-adjacent spatial merge candidates are considered for the merge candidates list.

In some implementations, in the event that the number of available spatial merge candidates (when considering those candidates illustrated in FIG. 2) are less than the predefined threshold, then one vertical, one horizontal, and one diagonal non-adjacent neighboring candidates can be assessed to determine their availability and, in response to determining availability, can be added to the merge candidate list. FIG. 8 illustrates an example in which up to three potential non-adjacent spatial merge candidates are evaluated for the merge candidates list. The non-adjacent candidates can be defined as V (vertical), D (diagonal) and H (horizontal). In some implementations, the non-adjacent blocks that are considered are limited to those within a maximum distance of 1 CTU to the current block. Availability of the nonadjacent spatial candidates blocks can be evaluated in a predefined order, such as vertical, horizontal, and diagonal.

Figure 9:
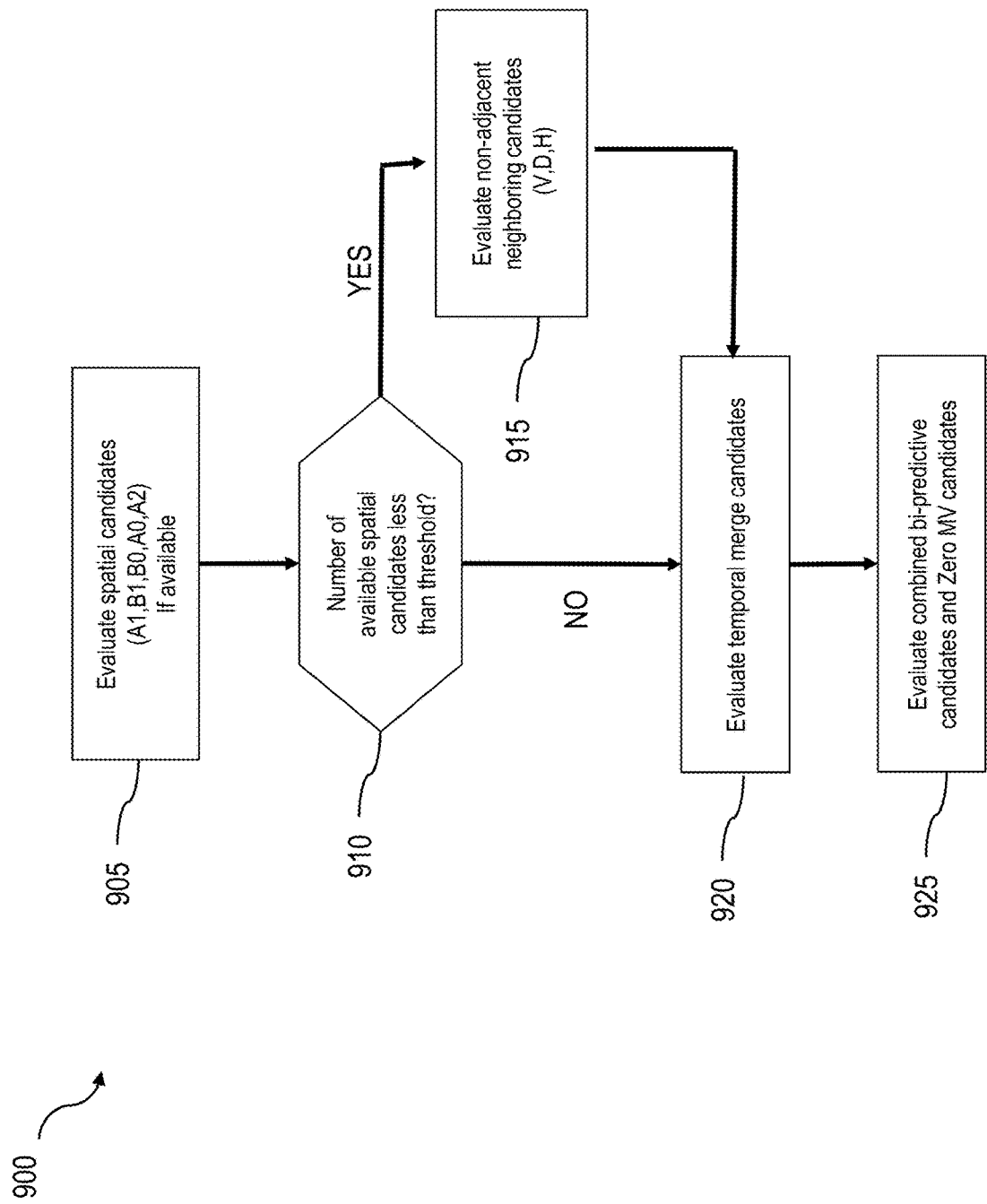
FIG. 9 illustrates a process flow diagram illustrating an example process of constructing a merge candidate list using a diagonal non-adjacent spatial candidate according to some aspects of the current subject matter.

FIG. 9 illustrates a process flow diagram illustrating an example process 900 of constructing a merge candidate list using a diagonal non-adjacent spatial candidate according to some aspects of the current subject matter. At 905, spatial candidates A1, B1, B0, A0, and A2 are evaluated. In some implementations, the spatial candidates may be evaluated in order of A1, B1, B0, A0, and A2. Evaluation can include determining whether the candidates are available. In addition, evaluation can include marking a candidate as available or unavailable. If a candidate is marked available, then the available candidate can be added to the merge candidate list.

At 910, whether the number of the available candidates already considered (e.g., A1, B1, B0, A0, and A2) is less than a predefined threshold (for example, 5 candidates) can be determined. If the number of candidates is less than a threshold, then at 915, V, D, and H candidates can be evaluated. Evaluation of the candidates can include determining whether the candidates are available. In addition, evaluation can include marking a candidate as available or unavailable. If a candidate is marked available, then the available candidate can be added to the merge candidate list.

The blocks considered as non-adjacent spatial candidates can be limited to those blocks within a maximum distance of 1 CTU from the current block, and according to a direction (e.g., horizontal, vertical, and diagonal). In some implementation, the vertical candidate is the block residing at a luma location that is immediately above B1. In some implementation, the vertical candidate is the block residing at a luma location that is immediately to the left of A1. In some implementations, the diagonal candidate is the block residing at a luma location that is immediately above and to the left of B2.

In some implementations, candidates are evaluated in order. For example, first the non-adjacent neighboring candidates in vertical direction (V) can be evaluated. Then, the non-adjacent neighboring candidate in a diagonal direction (V) can be evaluated. Then, the non-adjacent neighboring candidate in the horizontal direction (H) can be evaluated.

At 920, temporal merge candidates can be evaluated including adding available candidates to the merge candidate list, if applicable. At 925, bi-predictive and zero motion vector candidates can be evaluated and added to the merge candidate list, if applicable.

Figure 4:
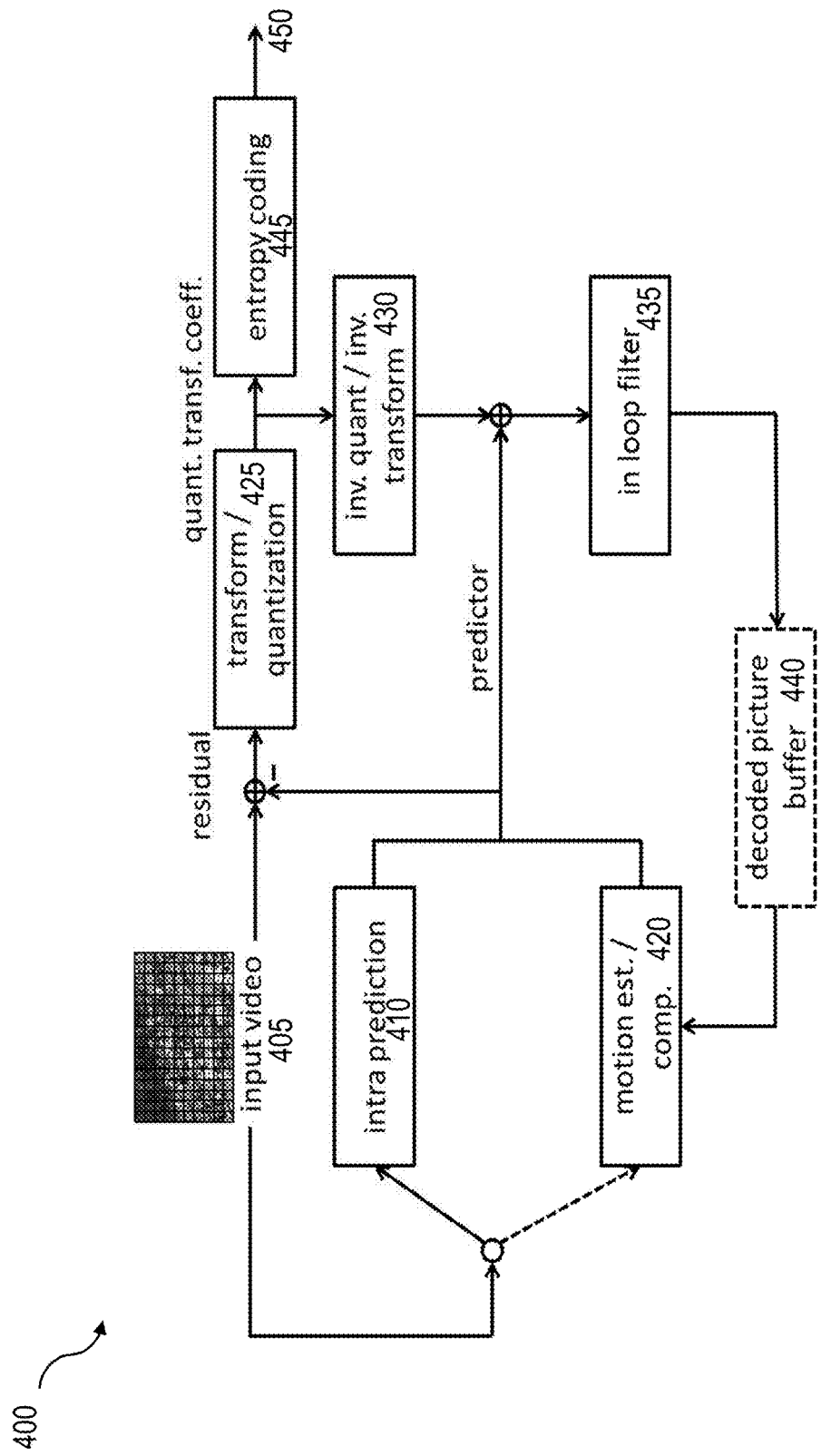
FIG. 4 is a system block diagram illustrating an example video encoder capable of constructing a merge candidate list, the constructing including adding a non-adjacent diagonal spatial candidate to the merge candidate list.

FIG. 4 is a system block diagram illustrating an example video encoder 400 capable of constructing a merge candidate list, the constructing including adding a non-adjacent diagonal spatial candidate to the merge candidate list. The example video encoder 400 receives an input video 405, which can be initially segmented or dividing according to a processing scheme, such as a tree-structured macro block partitioning scheme (e.g., quad-tree plus binary tree). An example of a tree-structured macro block partitioning scheme can include partitioning a picture frame into large block elements called coding tree units (CTU). In some implementations, each CTU can be further partitioned one or more times into a number of sub-blocks called coding units (CU). The final result of this portioning can include a group of sub-blocks that can be called predictive units (PU). Transform units (TU) can also be utilized.

The example video encoder 400 includes an intra prediction processor 415, a motion estimation/compensation processor 420 (also referred to as an inter prediction processor) capable of constructing a merge candidate list, the constructing including adding a non-adjacent diagonal spatial candidate to the merge candidate list, a transform/quantization processor 425, an inverse quantization/inverse transform processor 430, an in-loop filter 435, a decoded picture buffer 440, and an entropy coding processor 445. In some implementations, the motion estimation/compensation processor 420 can constructing a merge candidate list, the constructing including adding a non-adjacent diagonal spatial candidate to the merge candidate list. Bit stream parameters that signal an index into the constructed merge candidate list can be input to the entropy coding processor 445 for inclusion in the output bit stream 450.

In operation, for each block of a frame of the input video 405, whether to process the block via intra picture prediction or using motion estimation/compensation can be determined. The block can be provided to the intra prediction processor 410 or the motion estimation/compensation processor 420. If the block is to be processed via intra prediction, the intra prediction processor 410 can perform the processing to output the predictor. If the block is to be processed via motion estimation/compensation, the motion estimation/compensation processor 420 can perform the processing including constructing a merge candidate list, the constructing including adding a non-adjacent diagonal spatial candidate to the merge candidate list.

A residual can be formed by subtracting the predictor from the input video. The residual can be received by the transform/quantization processor 425, which can perform transformation processing (e.g., discrete cosine transform (DCT)) to produce coefficients, which can be quantized. The quantized coefficients and any associated signaling information can be provided to the entropy coding processor 445 for entropy encoding and inclusion in the output bit stream 450. The entropy encoding processor 445 can support encoding of signaling information. In addition, the quantized coefficients can be provided to the inverse quantization/inverse transformation processor 430, which can reproduce pixels, which can be combined with the predictor and processed by the in loop filter 435, the output of which is stored in the decoded picture buffer 440 for use by the motion estimation/compensation processor 420 that is capable of constructing a merge candidate list, the constructing including adding a non-adjacent diagonal spatial candidate to the merge candidate list.

Figure 5:
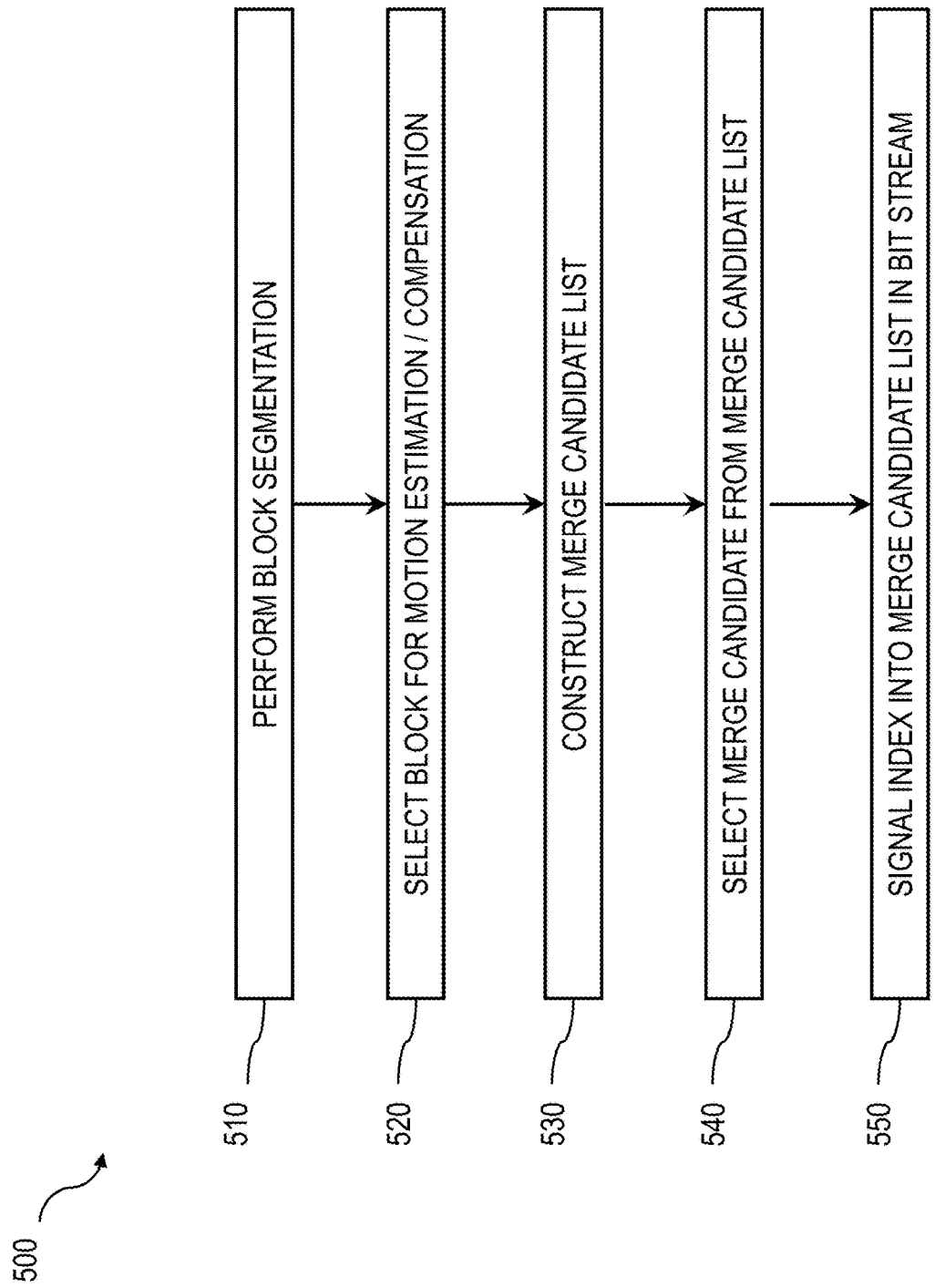
FIG. 5 is a process flow diagram illustrating an example process of encoding a video according to some aspects of the current subject matter that can increase compression efficiency.

FIG. 5 is a process flow diagram illustrating an example process 500 of encoding a video according to some aspects of the current subject matter that can increase compression efficiency. At 510, a video frame can undergo initial block segmentation, for example, using a tree-structured macro block partitioning scheme that can include partitioning a picture frame into CTUs and CUs. At 520, a block can be selected for motion estimation/compensation. The selection can include identifying according to a metric rule that the block is to be processed according to a merge mode. At 530, a merge candidate list can be constructed, the constructing including adding a non-adjacent diagonal spatial candidate to the merge candidate list. For example, the merge candidate list can be constructed according to the example approach described in FIG. 9.

At 540, a merge candidate can be selected from the merge candidate list. The merge candidate can be selected that includes a motion vector that is similar (e.g., satisfies a similarity criterion) to a motion vector of the current block. At 550, an index into the merge candidate list corresponding to the selected merge candidate can be included in the bit stream.

Figure 6:
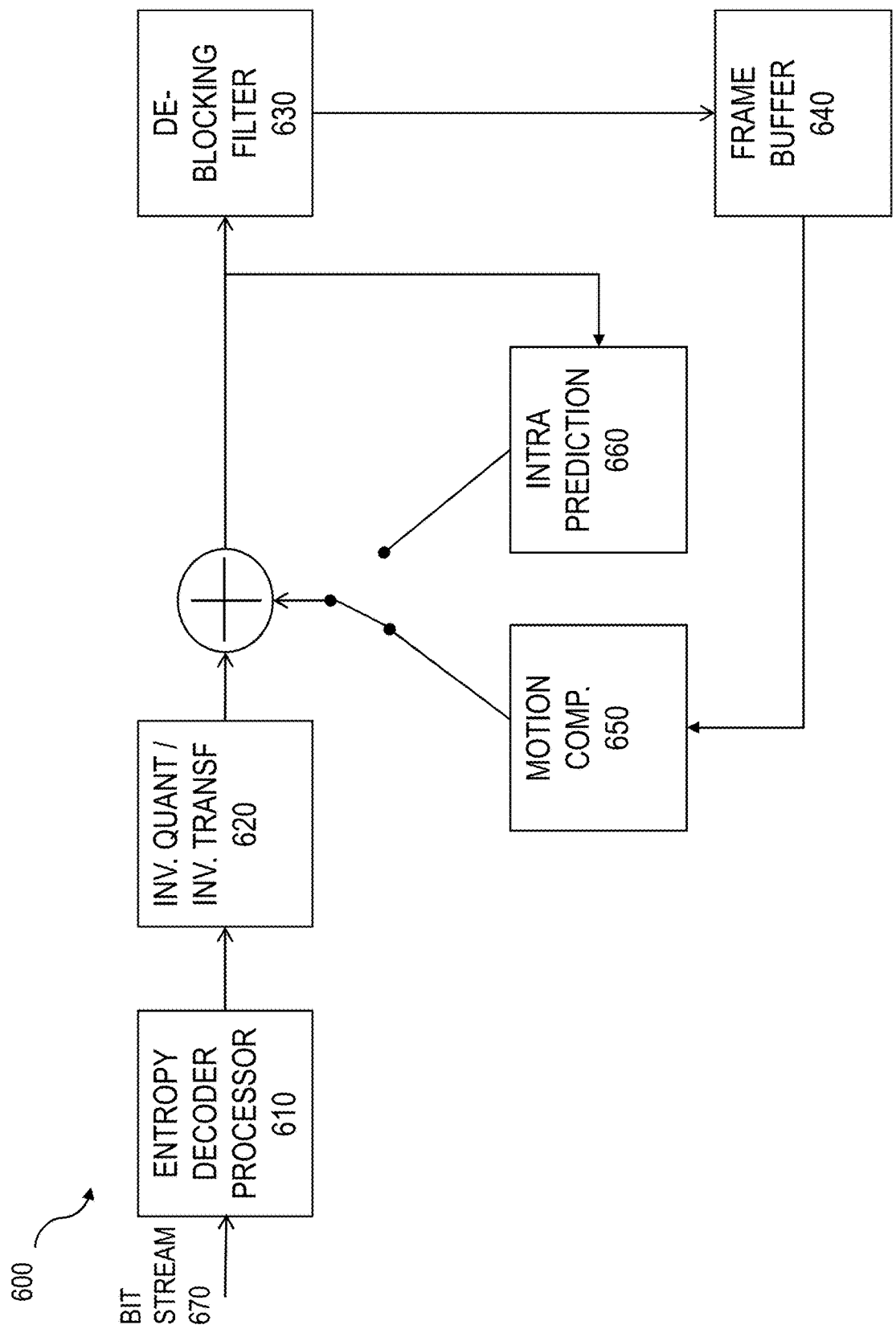
FIG. 6 is a system block diagram illustrating an example decoder capable of decoding a bitstream and constructing a merge candidate list, the constructing including adding a non-adjacent diagonal spatial candidate to the merge candidate list.

FIG. 6 is a system block diagram illustrating an example decoder 600 capable of decoding a bitstream 670 and constructing a merge candidate list, the constructing including adding a non-adjacent diagonal spatial candidate to the merge candidate list. The decoder 600 includes an entropy decoder processor 610, an inverse quantization and inverse transformation processor 620, a deblocking filter 630, a frame buffer 640, motion compensation processor 650 and intra prediction processor 660. In some implementations, the bitstream 670 includes parameters that signal a merge mode. The motion compensation processor 650 can reconstruct pixel information in merge mode, which can include constructing a merge candidate list, the constructing including adding a non-adjacent diagonal spatial candidate to the merge candidate list according to the example approach described in FIG. 9.

In operation, bit stream 670 can be received by the decoder 600 and input to entropy decoder processor 610, which entropy decodes the bit stream into quantized coefficients. The quantized coefficients can be provided to inverse quantization and inverse transformation processor 620, which can perform inverse quantization and inverse transformation to create a residual signal, which can be added to the output of motion compensation processor 650 or intra prediction processor 660 according to the processing mode. The output of the motion compensation processor 650 and intra prediction processor 660 can include a block prediction based on a previously decoded block. The sum of the prediction and residual can be processed by deblocking filter 630 and stored in a frame buffer 640. For a given block, (e.g., CU or PU), when the bit stream 670 signals that the mode is a merge mode, motion compensation processor 650 can construct the prediction utilizing a motion vector associated with a merge candidate that is identified using the index into the merge candidate list that is included in the bitstream. The motion compensation processor 650 can construct a merge candidate list for the current block, the constructing including adding a non-adjacent diagonal spatial candidate to the merge candidate list. Once constructed, the index into the merge candidate list can be utilized to identify the merge candidate block and associated motion information to be used in decoding the current block.

Figure 7:
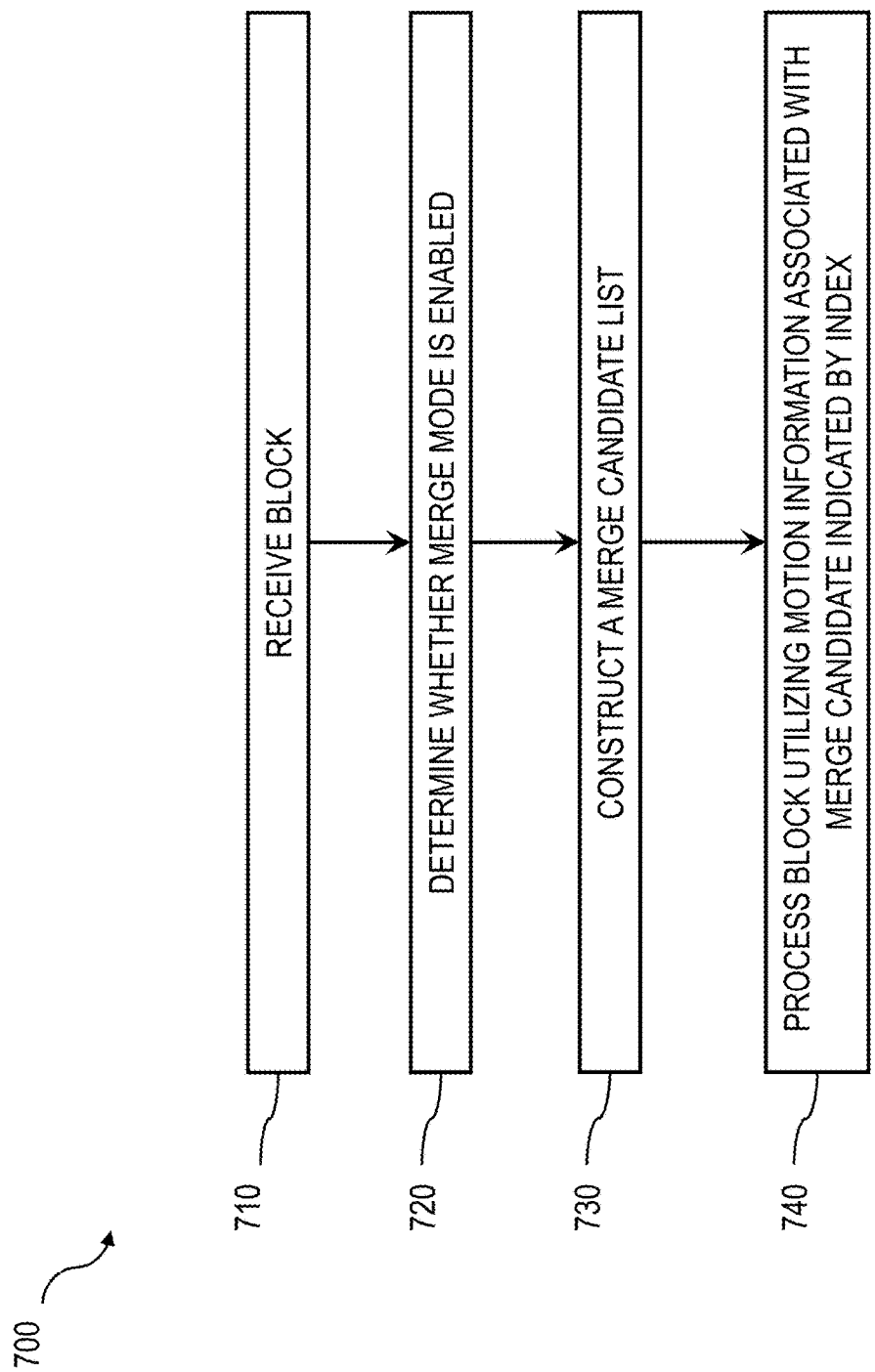
FIG. 7 is a process flow diagram illustrating an example process of decoding a bit stream, the decoding including constructing a merge candidate list, the constructing including adding a non-adjacent diagonal spatial candidate to the merge candidate list.

FIG. 7 is a process flow diagram illustrating an example process 700 of decoding a bit stream, the decoding including constructing a merge candidate list, the constructing including adding a non-adjacent diagonal spatial candidate to the merge candidate list. At 710, a block (e.g., CTU, CU, PU) is received. Receiving can include extracting and/or parsing the block and associated signaling information from the bit stream. At 720, whether a merge mode is enabled (e.g., true) for the block can be determined. If the merge mode is not enabled (e.g., false), the decoder can process the block using an alternative mode. If the merge mode is enabled (e.g., true), at 730, the decoder can construct a merge candidate list, the constructing including adding a non-adjacent diagonal spatial candidate to the merge candidate list, for example, as described with reference to FIG. 9. An index into the merge candidate list can be extracted or determined from the bitstream. Extraction or determining can include identifying and retrieving parameters from the bit stream (e.g., parsing the bitstream). At 740, the block can be processed utilizing motion information associated with the merge candidate indicated by the index. Processing the block can include producing a prediction and reconstructing pixel information for the block.

Although a few variations have been described in detail above, other modifications or additions are possible. For example, partitioning can be signaled in the bit stream based on rate-distortion decisions in the encoder. Each block can utilize motion compensated prediction or intra-prediction. The boundary of the predicted regions can be smoothed before the residual is added. For residual coding, the encoder can select between a regular rectangular DCT for the whole block and a Shape Adaptive DCT.

In some implementations, a quadtree plus binary decision tree (QTBT) can be implemented. In QTBT, at the Coding Tree Unit level, the partition parameters of QTBT are dynamically derived to adapt to the local characteristics without transmitting any overhead. Subsequently, at the Coding Unit level, a joint-classifier decision tree structure can eliminate unnecessary iterations and control the risk of false prediction.

In some implementations, additional syntax elements can be signaled at different hierarchy levels of the bitstream. For enabling merge mode for an entire sequence, an enable flag can be coded in a Sequence Parameter Set (SPS). Further, a CTU flag can be coded at the coding tree unit (CTU) level to indicate, whether any coding units (CU) use merge mode. A CU flag can be coded to indicate whether the current coding unit utilizes merge mode.

The subject matter described herein provides many technical advantages. For example, by adding a non-adjacent diagonal spatial merge candidate to the merge candidate list, compression efficiency can be improved.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random-access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A decoder configured to:

receive a bitstream including a coded picture partitioned into an array of coded blocks, one of the blocks being a current block, wherein the current block being a symmetric block;

construct for the current block a merge list of motion vector candidates, the merge list having a fixed number of candidates;

the constructing comprising:

evaluate a plurality of candidates from blocks spatially adjacent to the symmetric current block, and, if available, add the spatially adjacent candidates to the merge list;

if the number of spatially adjacent candidates added to the merge list is less than the fixed number, evaluate, according to a predetermined order, at least one candidate from a spatially non-adjacent block, at least one temporal candidate, a candidate derived from two other candidates, and a zero motion vector candidate; and if available, add these candidates to the merge list until the number of candidates in the merge list equals the fixed number, wherein the candidate from a spatially non-adjacent block has a higher priority for inclusion in the merge list than the candidate derived from two other candidates and the zero motion vector candidate and wherein one or more of the spatially adjacent candidates are unavailable so that the number of spatially adjacent candidates added to the list is less than the fixed number, one unavailable spatially adjacent candidate being an asymmetric block, and wherein the spatially non-adjacent block is in the same row of coding tree units as the current block; and decode the current block using the constructed merge list.

2. The decoder of claim 1 wherein the asymmetric unavailable spatially adjacent candidate is an above left spatially adjacent candidate.

3. The decoder of claim 2 wherein a below left spatially adjacent candidate is asymmetric and unavailable.

* * * * *